US011554779B2

(12) United States Patent
Kim

(10) Patent No.: US 11,554,779 B2
(45) Date of Patent: Jan. 17, 2023

(54) APPARATUS AND METHOD FOR CONTROLLING BACKWARD DRIVING OF VEHICLE

(71) Applicant: HYUNDAI MOBIS Co., Ltd., Seoul (KR)

(72) Inventor: Jeong Ku Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 25 days.

(21) Appl. No.: 17/102,912

(22) Filed: Nov. 24, 2020

(65) Prior Publication Data

US 2021/0155239 A1  May 27, 2021

(30) Foreign Application Priority Data

Nov. 25, 2019 (KR) .......... 10-2019-0152056
Nov. 27, 2019 (KR) .......... 10-2019-0154429

(51) Int. Cl.
*B60W 30/18* (2012.01)
*B60W 50/00* (2006.01)
*G05D 1/02* (2020.01)

(52) U.S. Cl.
CPC .. *B60W 30/18036* (2013.01); *B60W 50/0098* (2013.01); *B60W 2050/0031* (2013.01);
(Continued)

(58) Field of Classification Search
CPC ....... B60W 30/18036; B60W 50/0098; B60W 2050/0031; B60W 2520/06;
(Continued)

(56) References Cited

U.S. PATENT DOCUMENTS 10,569,651 B2 * 2/2020 Zhu ............... B60W 30/143
2013/0079988 A1 * 3/2013 Hirao ............. B60W 10/184
701/38
(Continued)

FOREIGN PATENT DOCUMENTS

| CN | 105313958 A | * | 2/2016 | ........... B60W 30/06 |
| CN | 111717204 A | * | 9/2020 | |
| KR | 20150077823 | | 10/2015 | |

OTHER PUBLICATIONS

CN-111717204-A translation (Year: 2020).*
CN-105313958-A translation (Year: 2016).*

*Primary Examiner* — Jeff A Burke
*Assistant Examiner* — Kyle T Johnson
(74) *Attorney, Agent, or Firm* — H.C. Park & Associates, PLC

(57) ABSTRACT

An apparatus for controlling backward driving of a vehicle including: a driving trajectory generation unit configured to generate a driving trajectory for backward driving of an ego vehicle on a target path, using sensing information acquired while the ego vehicle drives forward along the target path; and a control unit configured to control the backward driving of the ego vehicle on the target path according to the driving trajectory generated by the driving trajectory generation unit, correct the driving trajectory using driving information of another vehicle, which has driven backward on the target path before the ego vehicle, when a change on the target path is sensed in comparison to during the forward driving of the ego vehicle during the process of controlling the backward driving of the ego vehicle, and control the backward driving of the ego vehicle according to the corrected driving trajectory.

10 Claims, 11 Drawing Sheets

(52) U.S. Cl.
 CPC ..... *B60W 2520/06* (2013.01); *B60W 2520/14* (2013.01); *B60W 2520/28* (2013.01); *B60W 2540/18* (2013.01); *B60W 2554/404* (2020.02); *B60W 2556/65* (2020.02); *G05D 1/0214* (2013.01)

(58) Field of Classification Search
 CPC ......... B60W 2520/14; B60W 2520/28; B60W 2540/18; B60W 2554/404; B60W 2556/65; B60W 40/10; B60W 2050/0025; B60W 2556/10; B62D 15/0285; G05D 1/0214
 See application file for complete search history.

(56) References Cited

U.S. PATENT DOCUMENTS

| | | | |
|---|---|---|---|
| 2016/0280265 A1* | 9/2016 | Hass | B62D 15/0265 |
| 2018/0047293 A1* | 2/2018 | Dudar | G05D 1/0259 |
| 2018/0273046 A1* | 9/2018 | Berntorp | B60T 8/172 |
| 2019/0121351 A1* | 4/2019 | Niewiadomski | B62D 6/002 |
| 2019/0138017 A1* | 5/2019 | Sarkar | B62D 15/021 |
| 2019/0184981 A1* | 6/2019 | Jung | B60W 30/09 |
| 2020/0057453 A1* | 2/2020 | Laws | G08G 1/22 |
| 2020/0122717 A1* | 4/2020 | Kim | B60W 30/18036 |
| 2021/0078586 A1* | 3/2021 | Sakaguchi | B60W 30/06 |
| 2021/0155239 A1* | 5/2021 | Kim | B60W 50/0098 |
| 2021/0179134 A1* | 6/2021 | Zhu | G08G 1/166 |

\* cited by examiner

APPARATUS AND METHOD FOR CONTROLLING BACKWARD DRIVING OF VEHICLE

CROSS-REFERENCE TO RELATED APPLICATION

This application claims priority from and the benefit of Korean Patent Application No. 10-2019-0152056, filed on Nov. 25, 2019, and Korean Patent Application No. 10-2019-0154429, filed on Nov. 27, 2019, which are hereby incorporated by reference for all purposes as if set forth herein.

BACKGROUND

Field

Exemplary embodiments of the present disclosure relate to an apparatus and method for controlling backward driving of a vehicle, and more particularly, to an apparatus and method for controlling backward driving of a vehicle, which can control backward driving of a vehicle when the vehicle drives backward on a path where the vehicle has driven forward.

Discussion of the Background

In general, many drivers have difficulties in driving a vehicle backward because they need to drive the vehicle backward along a moving trajectory different from that during forward driving. That is, since there is a dead spot even though a back mirror and side mirrors are used during the backward driving of the vehicle, a driver needs to check an obstacle while frequently checking a backward area in person with the naked eye, and inconveniently drive the vehicle backward by stepping on an accelerator pedal or a brake pedal while steering the vehicle.

In particular, when a vehicle drives in a narrow alley or a parking lot with a narrow parking space, the vehicle may bump into an oncoming vehicle, and thus may not drive forward any more. In this case, the vehicle needs to drive backward along the path on which the vehicle has driven forward. In many cases, however, a beginning driver or unskilled driver has difficulties in driving the vehicle backward in such a narrow space, and thus may neither drive the vehicle forward nor drive the vehicle backward.

Currently, as a system for assisting backward driving of a vehicle, a rear-view monitor, PAS (Parking Assist System), PGS (Parking Guide System) and the like are used.

The rear-view monitor has a limitation in securing a view to monitor left and right sides, and the PAS and PGS continuously generate alarm sounds and thus may make a driver feel an anxiety. Furthermore, when a vehicle drives backward on a narrow road, the vehicle may often lean to the left or right while a steering wheel is slightly turned to the left or right. In this case, the PAS and PGS have a limitation in overcoming such a situation.

Furthermore, a blind spot warning system refers to a system that warns a driver of whether another vehicle is present on the rear or left/right side within a predetermined distance (for example, 7 m), using a radar sensor, when an ego vehicle changes lanes during driving. The blind spot warning system is not suitable for being used as a device which assists backward driving when the ego vehicle drives backward on an alley or narrow road. Furthermore, the blind spot warning system has difficulties in sensing surrounding obstacles without a blind spot sensor such as a radar sensor.

The related art of the present disclosure is disclosed in Korean Patent Application No. 2015-0077823 published on Jul. 8, 2015 and entitled "Auto Backing Route Control System for Vehicle".

Recently, a backward driving assist system or autonomous backward driving assist system has been developed in order to promote driving safety and to improve a driver's convenience, during backward driving of a vehicle. The backward driving assist system refers to a system that automatically steers a vehicle to drive backward, even though a driver does not operate a steering wheel when the vehicle needs to drive backward along the path on which the vehicle has driven forward. In other words, the backward driving assist system memorizes the driving path on which the vehicle has been driven forward. Then, when the vehicle needs to drive backward, the backward driving assist system performs a reverse operation to automatically steer the vehicle, thereby assisting the backward driving.

Since the conventional backward driving assist system calculates a driving trajectory for backward driving based on the driving trajectory memorized during forward driving, the backward driving assist system has a limitation in coping with a change in driving environment, which occurs on the corresponding path during the backward driving. For example, when an obstacle which had not been present during the forward driving appears during the backward driving, the backward driving assist system may not bypass the obstacle through a driving trajectory for the backward driving, which is calculated based on the driving trajectory memorized during the forward driving. In this case, the vehicle cannot be driven backward.

Furthermore, when a following vehicle entering the corresponding path from the rear is present during the backward driving, the following vehicle cannot recognize a situation in which the following vehicle cannot move forward on the corresponding path. Thus, a collision accident or congestion may occur between the ego vehicle which is driving backward and the following vehicle which is entering the path.

Furthermore, the backward driving assist system calculates a displacement of the vehicle based on a sensing value acquired through a sensor mounted in a vehicle, and decides a driving trajectory for backward driving. That is, since the backward driving assist system applies fixed logic to decide the driving trajectory for backward driving, a road characteristic such as the curvature of a road is not reflected into the driving trajectory calculation process. Thus, the backward driving assist system has a limitation in calculating the optimized driving trajectory.

SUMMARY

Exemplary embodiments of the present invention provide an apparatus and method for controlling backward driving of a vehicle, which can not only control a vehicle to normally drive backward on a path by actively coping with a change in driving environment on the path where the vehicle is driving backward, but also control the vehicle to recognize a situation in which a following vehicle entering the corresponding path cannot move forward, thereby preventing a collision or congestion between the ego vehicle and the following vehicle.

Exemplary embodiments of the present invention also provide an apparatus and method for controlling backward driving of a vehicle, which can generate a driving trajectory in consideration of a road characteristic such as the curvature of a road when a backward driving assist system generates the driving trajectory along which the vehicle is to drive backward, thereby securing the accuracy of the driving trajectory generation.

Additional features of the invention will be set forth in the description which follows, and in part will be apparent from the description, or may be learned by practice of the invention.

An exemplary embodiment of the present invention provides an apparatus for controlling backward driving of a vehicle including: a driving trajectory generation unit configured to generate a driving trajectory for backward driving of an ego vehicle on a target path, using sensing information acquired while the ego vehicle drives forward along the target path; and a control unit configured to control the backward driving of the ego vehicle on the target path according to the driving trajectory generated by the driving trajectory generation unit, correct the driving trajectory using driving information of another vehicle, which has driven backward on the target path before the ego vehicle, when a change on the target path is sensed in comparison to during the forward driving of the ego vehicle during the process of controlling the backward driving of the ego vehicle, and control the backward driving of the ego vehicle according to the corrected driving trajectory.

The driving information of the another vehicle may include an actual driving trajectory along which the another vehicle has driven backward on the target path, or longitudinal and lateral displacements of the another vehicle while the another vehicle drives backward.

The change on the target path may include an entry of an object to interrupt the backward driving of the ego vehicle on the driving trajectory.

The control unit may correct the driving trajectory to follow an actual driving trajectory along which the another vehicle has driven backward on the target path, such that the ego vehicle drives backward by bypassing the object.

When a following vehicle entering the target path is sensed while the control unit controls the backward driving of the ego vehicle on the target path, the control unit may transfer a notification to the following vehicle in order to stop the following vehicle from entering the target path.

The ego vehicle and the another vehicle may communicate with each other through V2X (Vehicle to Everything) communication, and the ego vehicle and the following vehicle may communicate with each other through V2X communication.

The apparatus may be applied to an autonomous backward driving assist system applied to the ego vehicle.

Another exemplary embodiment of the present invention provides an apparatus for controlling backward driving of a vehicle including: a first driving trajectory generation unit configured to generate a first driving trajectory for backward driving of a vehicle, based on rear wheel speed information and steering angle information, which are acquired while the vehicle drives forward along a target path; a second driving trajectory generation unit configured to generate a second driving trajectory for backward driving of the vehicle, based on the rear wheel speed information which is acquired while the vehicle drives forward along the target path; and a control unit configured to decide a first weight and a second weight for compensating for a complementary characteristic between the first and second driving trajectories by applying a curvature parameter, indicating the curvature of the target path, to a previously-trained weight decision model, decide an optimal driving trajectory by applying the decided first and second weights to the first and second driving trajectories, respectively, and control the backward driving of the vehicle on the target path according to the decided optimal driving trajectory.

The rear wheel speed information may include a wheel pulse count and a left/right rear wheel speed difference. The first driving trajectory generation unit may generate the first driving trajectory by estimating a longitudinal displacement of the vehicle through the wheel pulse count and estimating a lateral displacement of the vehicle through the steering angle information, and the second driving trajectory generation unit may generate the second driving trajectory by estimating the longitudinal displacement of the vehicle through the wheel pulse count and estimating the lateral displacement of the vehicle through the left/right rear wheel speed difference.

The curvature parameter may include one or more of a yaw rate, a steering angle and the left/right rear wheel speed difference of the vehicle. The weight decision model may be previously trained to receive one or more of the yaw rate, the steering angle and the left/right rear wheel speed difference, which are acquired as the curvature parameter while the vehicle drives, and to decide the first weight which decreases as a driving road has a large curvature, and decide the second weight which increases as the driving road has a large curvature.

The control unit may decide the first and second weights by applying one or more of the yaw rate, the steering angle and the left/right steering wheel speed difference, which are acquired as the curvature parameter indicating the curvature of the target path while the vehicle drives forward on the target path, to the weight decision model, decide an optimal driving trajectory by merging the first and second driving trajectories through a process of applying the decided first and second weights to the first and second driving trajectories, respectively, and then control the backward driving of the vehicle on the target path according to the decided optimal driving trajectory.

The second weight may be decided in a range equal to or more than a pre-defined lower limit value through the weight decision model.

The control unit may acquire one or more of the yaw rate, the steering angle and the left/right rear wheel speed difference of the vehicle as the curvature parameter through a yaw rate sensor, a steering angle sensor and a wheel speed sensor, which are mounted in the vehicle.

The apparatus may be applied to an autonomous backward driving assist system applied to the vehicle.

Another exemplary embodiment of the present invention provides a method for controlling backward driving of a vehicle including: generating, by a first driving trajectory generation unit, a first driving trajectory for backward driving of a vehicle, based on rear wheel speed information and steering angle information, which are acquired while the vehicle drives forward along a target path; generating, by a second driving trajectory generation unit, a second driving trajectory for backward driving of the vehicle, based on the rear wheel speed information which is acquired while the vehicle drives forward along the target path; and deciding, by a control unit, a first weight and a second weight for compensating for a complementary characteristic between the first and second driving trajectories by applying a curvature parameter, indicating the curvature of the target path, to a previously-trained weight decision model, deciding an optimal driving trajectory by applying the decided first and second weights to the first and second driving trajectories, respectively, and controlling the backward driving of the vehicle on the target path according to the optimal driving trajectory.

In the exemplary embodiments, when a change in the driving environment, such as an obstacle, is sensed on the path where the ego vehicle is driving backward, the apparatus and method may correct the driving trajectory through driving information of another vehicle which has driven backward on the corresponding path before the ego vehicle, such that the ego vehicle can successfully drive backward by bypassing the obstacle. Furthermore, the apparatus and method may transfer a notification to a following vehicle entering the corresponding path in order to notify that the following vehicle cannot move forward, and thus prevent a collision or congestion between the ego vehicle and the following vehicle.

Furthermore, the apparatus and method may generate a backward driving trajectory by merging two driving trajectories whose accuracies are complementary to each other, according to the curvature of the road, in the backward driving assist system. Thus, the apparatus and method may remove an error on the driving trajectory depending on the road characteristic, thereby generating a more accurate driving trajectory.

It is to be understood that both the foregoing general description and the following detailed description are exemplary and explanatory and are intended to provide further explanation of the invention as claimed.

DETAILED DESCRIPTION OF THE ILLUSTRATED EMBODIMENTS

Hereinafter, an apparatus and method for controlling backward driving of a vehicle will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

The embodiments described in this specification may be implemented with a method or process, an apparatus, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device, for example. The processor includes a communication device, such as a computer, a cell phone, a PDA (Personal Digital Assistant) and another device, which can facilitate information communication between end users.

Figure 1:
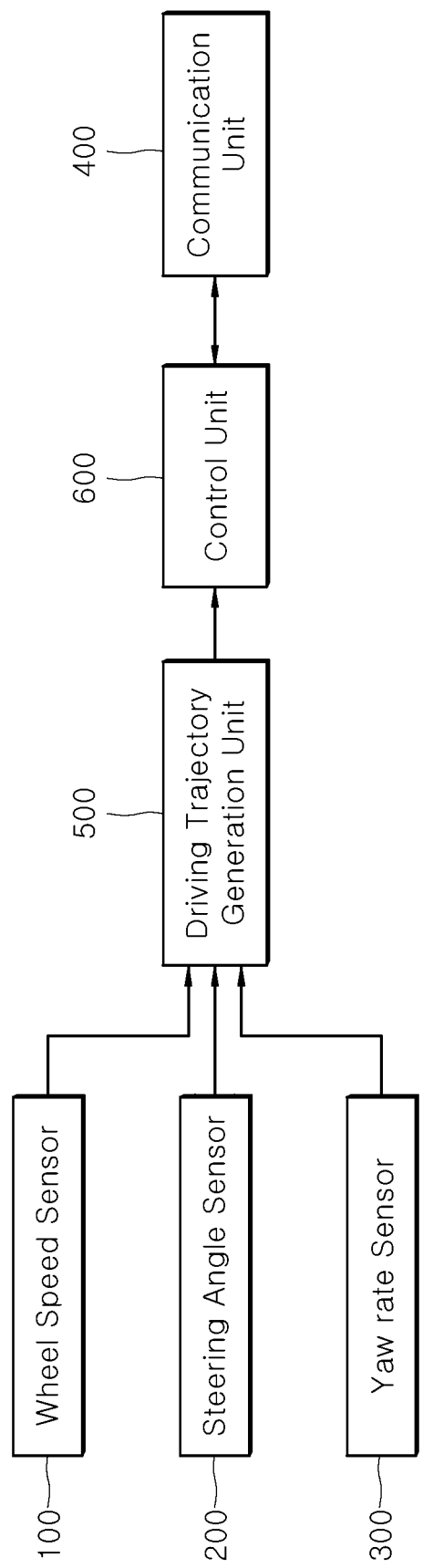
FIG. 1 is a block configuration diagram for describing an apparatus for controlling backward driving of a vehicle in accordance with a first embodiment of the present disclosure.
Figure 2:
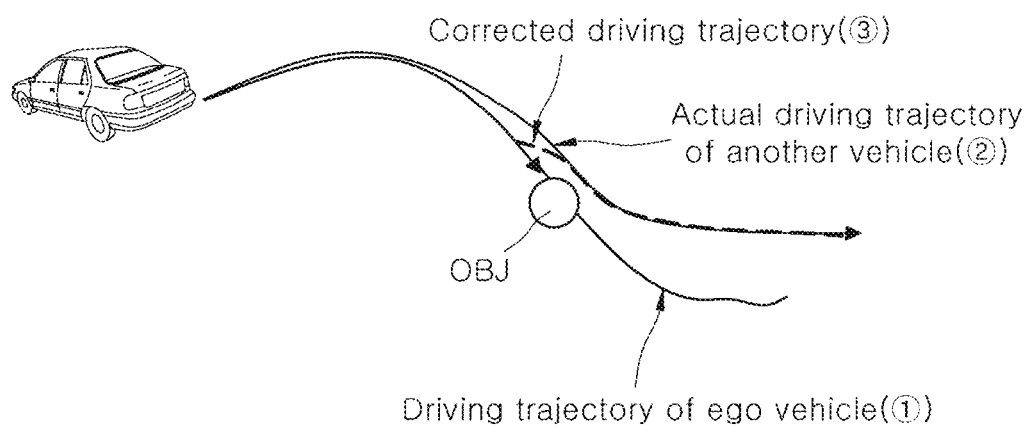
FIG. 2 is a diagram illustrating a process of correcting a driving trajectory in the apparatus for controlling backward driving of a vehicle in accordance with the first embodiment of the present disclosure.
Figure 3:
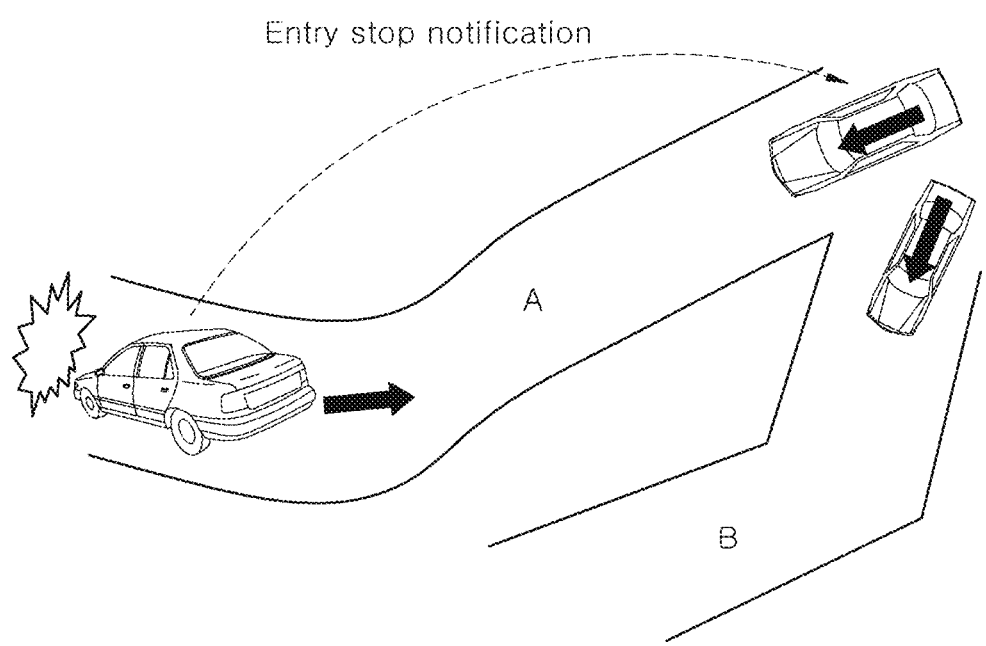
FIG. 3 is a diagram illustrating a process of transferring an entry stop notification to a following vehicle in the apparatus for controlling backward driving of a vehicle in accordance with the first embodiment of the present disclosure.

FIG. 1 is a block configuration diagram for describing an apparatus for controlling backward driving of a vehicle in accordance with a first embodiment of the present disclosure, FIG. 2 is a diagram illustrating a process of correcting a driving trajectory in the apparatus for controlling backward driving of a vehicle in accordance with the first embodiment of the present disclosure, and FIG. 3 is a diagram illustrating a process of transferring an entry stop notification to a following vehicle in the apparatus for controlling backward driving of a vehicle in accordance with the first embodiment of the present disclosure.

Referring to FIG. 1, the apparatus for controlling backward driving of a vehicle in accordance with the first embodiment of the present disclosure may include a wheel speed sensor 100, a steering angle sensor 200, a yaw rate sensor 300, a communication unit 400, a driving trajectory generation unit 500 and a control unit 600. The apparatus for controlling backward driving of a vehicle in accordance with the first embodiment of the present disclosure may be applied to the above-described autonomous backward driving assist system (backward driving assist system).

The wheel speed sensor 100 may count wheel pulses of a wheel (a rear wheel in the present embodiment), and a rear wheel speed, a left/right rear wheel speed difference, and a vehicle speed of an ego vehicle may be recognized from the wheel pulse count value. The wheel pulse count of the rear wheel may indicate the average value of wheel pulse counts of left and right rear wheels, for example. As described below, the wheel pulse count may be used to estimate a longitudinal displacement of the ego vehicle during a process of generating a driving trajectory for backward driving of the ego vehicle. The left/right rear wheel speed difference may indicate a difference between the speed of the left rear wheel and the speed of the right rear wheel. As described below, the left/right rear wheel speed difference may be used to estimate a lateral displacement of the ego vehicle during the process of generating the driving trajectory for backward driving of the ego vehicle.

The steering angle sensor 200 may detect a steering angle of a steering wheel. In the present embodiment, the steering angle may be used to estimate a lateral displacement of the ego vehicle during the process of generating the driving trajectory for backward driving of the ego vehicle.

The yaw rate sensor 300 may detect a yaw rate of the vehicle. The yaw rate may indicate the ratio of a value by which the vehicle is rotated to the left based on the Z-axis of the vehicle to a value by which the vehicle is rotated to the right based on the Z-axis of the vehicle. In the present embodiment, the yaw rate may be used to estimate a lateral displacement of the ego vehicle during the process of generating the driving trajectory for backward driving of the ego vehicle.

The communication unit 400 may be implemented as a V2X (Vehicle to Everything) communication module through which the ego vehicle communicates with another vehicle or a following vehicle through V2X communication. The control unit 600 which will be described below may receive driving information of the another vehicle through the communication unit 400, and transmit an entry stop notification to the following vehicle.

The driving trajectory generation unit 500 may generate the driving trajectory for backward driving of the ego vehicle along a target path, using sensing information which is acquired while the ego vehicle drives forward along the target path. The sensing information may include the wheel pulse count of the rear wheel, the left/right rear wheel speed difference, the steering angle and the yaw rate, which have been described above. Thus, the driving trajectory generation unit 500 may generate the driving trajectory for backward driving by estimating the longitudinal displacement of the ego vehicle through the wheel pulse count and estimating the lateral displacement of the ego vehicle through the left/right rear wheel speed difference, the steering angle and the yaw rate. That is, the driving trajectory generation unit 500 may estimate the longitudinal displacement of the vehicle by accumulating the wheel pulse counts, and estimate the lateral displacement of the ego vehicle using the left/right rear wheel speed difference and changes in the steering angle and the yaw rate. Then, the driving trajectory generation unit 500 may generate the driving trajectory by mapping the estimated longitudinal displacement and the estimated lateral displacement in accordance with time.

The control unit 600 may control the backward driving of the ego vehicle on the target path according to the driving trajectory generated by the driving trajectory generation unit 500. As described above, the apparatus for controlling backward driving of a vehicle in accordance with the present embodiment may be applied to the autonomous backward driving assist system (backward driving assist system) applied to a vehicle. Thus, when a driver performs an operation of starting an autonomous backward driving assist function (for example, P-stage of transmission→function switch on→R stage of transmission in stopping state), the backward driving of the vehicle may be controlled according to the driving trajectory through an acceleration/deceleration operation by the driver and a system automatic steering operation by the control unit 600.

The driving trajectory generated by the driving trajectory generation unit 500 is a trajectory which is generated based on sensing information acquired while the ego vehicle drives forward on the target path. Therefore, when the driving environment is changed on the target path while the backward driving of the ego vehicle is controlled by the control unit 600, the backward driving of the ego vehicle may not be completed through a driving trajectory into which the corresponding change is not reflected. For example, when an obstacle which had not been present during the forward driving is sensed during the backward driving, the driving trajectory generated by the driving trajectory generation unit 500 needs to be corrected so that the ego vehicle drives backward by bypassing the corresponding obstacle.

In the present embodiment, when a change on the target path is sensed during the process of controlling the backward driving of the ego vehicle in comparison to during the forward driving of the ego vehicle, the control unit 600 may correct the driving trajectory using driving information of another vehicle which has driven backward on the target path before the ego vehicle, and control the backward driving of the ego vehicle according to the corrected driving trajectory. The change on the target path may include an entry of an object (for example, an obstacle such as a falling rock) which interrupts the backward driving of the ego vehicle on the driving trajectory.

At this time, the control unit 600 may correct the driving trajectory to follow an actual driving trajectory along which the another vehicle has driven backward on the target path, such that the ego vehicle drives backward by bypassing the object. In the example of FIG. 2, when an object OBJ is sensed during a process of controlling backward driving according to a driving trajectory ①, the control unit 600 may correct the driving trajectory ① into a driving trajectory ③ such that the driving trajectory follows an actual driving trajectory ② of another vehicle based on the current location. The driving information of the another vehicle, which is required to correct the driving trajectory ①, may be received through the communication unit 400, and the driving information of the another vehicle may include the actual driving trajectory along which the another vehicle has driven backward on the target path, or longitudinal and lateral displacements of the another vehicle during the process in which the another vehicle has driven backward on the target path. That is, the control unit 600 may directly correct the driving trajectory of the ego vehicle into the actual driving trajectory of the another vehicle, or correct the driving trajectory of the ego vehicle by applying the longitudinal and lateral displacements of the another vehicle to the driving trajectory of the ego vehicle, at the point of time that the object is sensed. In this way, the control unit 600 may correct the driving trajectory of the ego vehicle to follow the actual driving trajectory of the another vehicle.

When the driving trajectory is corrected through the above-described process, the control unit 600 may control the backward driving of the ego vehicle again according to the corrected driving trajectory. Thus, as the backward driving of the ego vehicle is controlled according to the corrected driving trajectory ③ of FIG. 2, the ego vehicle may successfully drive backward by bypassing the object OBJ.

Furthermore, when a following vehicle enters the corresponding path from the rear while the backward driving of the ego vehicle is controlled, the following vehicle cannot recognize a situation in which the following vehicle cannot move forward on the corresponding path. Thus, a collision accident or congestion may occur between the ego vehicle which is driving backward and the following vehicle which is entering the path.

In the present embodiment, when the following vehicle entering the target path is sensed as illustrated in FIG. 3 while the control unit 600 controls the backward driving of the ego vehicle on the target path, the control unit 600 may transfer an entry stop notification to the following vehicle through the communication unit 400 in order to stop the following vehicle from entering the target path. The following vehicle may be sensed through various methods. For example, the following vehicle may be sensed through a camera sensor (for example, a rear camera sensor) or distance sensor (for example, a rear ultrasonic sensor, rear radar sensor or rear lidar sensor) mounted in the ego vehicle, or sensed through location information of the following vehicle, which is received from the following vehicle through the communication unit 400. By transmitting the above-described entry stop notification to the following vehicle, the ego vehicle can prevent a congestion of the backward driving path, and the following vehicle can drive to another path B instead of the target path A as illustrated in FIG. 3.

So far, it has been described that the driving trajectory generation unit 500 and the control unit 600 are separated from each other, in order to promote understandings of the present embodiment. In an embodiment, however, the function of the driving trajectory generation unit 500 may be integrated with that of the control unit 600. The driving trajectory generation unit 500 and the control unit 600 may be implemented as a processor or SoC (System on Chip) which processes and calculates various data, and designed to load instructions or data received from other components to a memory and process the loaded instructions or data, and store various data in the memory.

Figure 4:
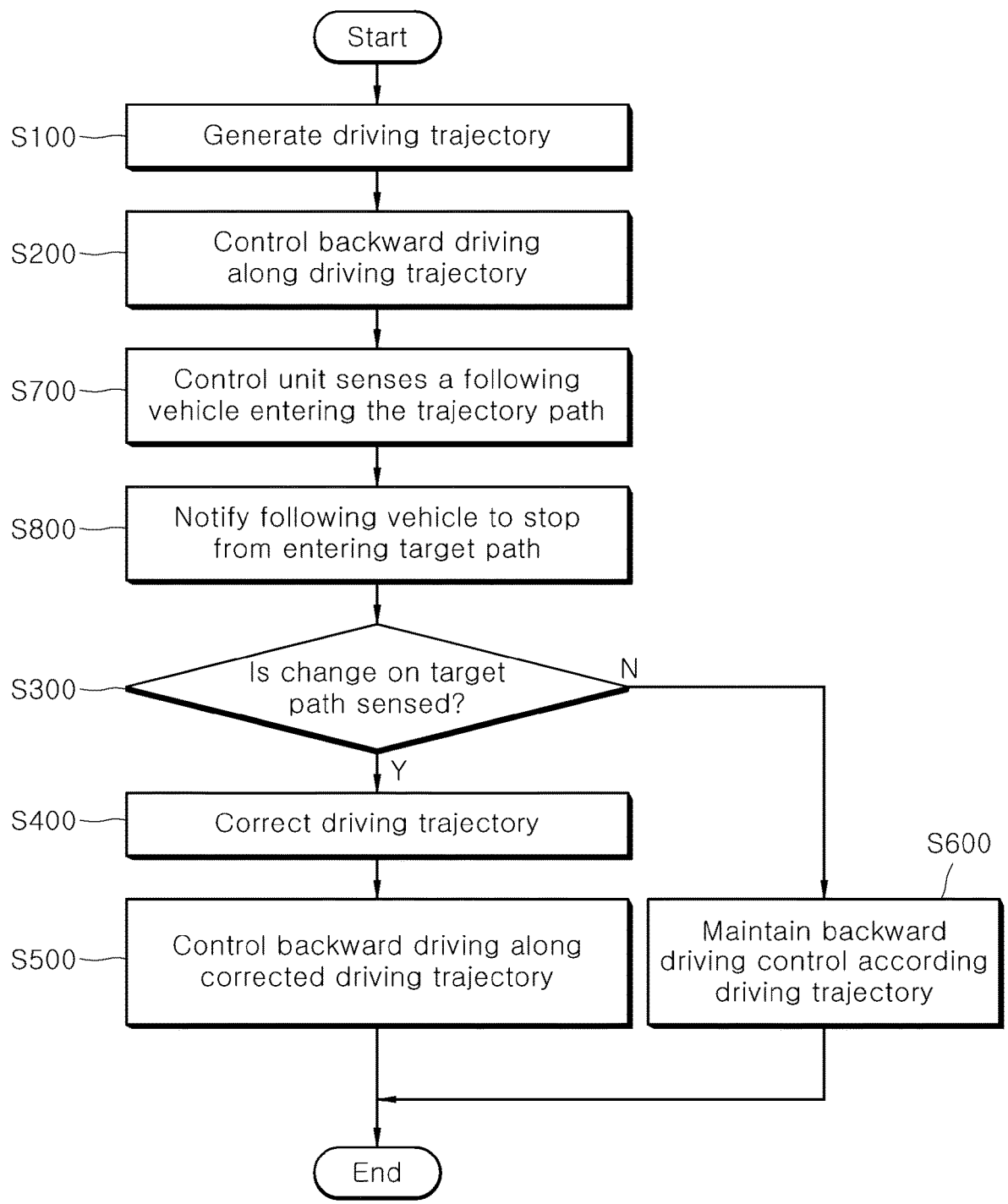
FIG. 4 is a flowchart for describing a method for controlling backward driving of a vehicle in accordance with the first embodiment of the present disclosure.

FIG. 4 is a flowchart for describing a method for controlling backward driving of a vehicle in accordance with the first embodiment of the present disclosure. Referring to FIG. 4, the method for controlling backward driving of a vehicle in accordance with the first embodiment of the present disclosure will be described. Hereafter, the descriptions of contents overlapping the above-described contents will be omitted herein, and the following descriptions will be focused on a time series configuration.

First, the driving trajectory generation unit 500 generates a driving trajectory for backward driving of an ego vehicle on a target path, using sensing information which is acquired while the ego vehicle drives forward along the target path, in step S100.

Then, the control unit 600 controls the backward driving of the ego vehicle on the target path according to the driving trajectory generated in step S100, in step S200.

Then, the control unit 600 senses a change on the target path in comparison to during the forward driving of the ego vehicle, during the process of controlling the backward driving of the ego vehicle, in step S300. As described above, the change on the target path includes an entry of an object which interrupts the backward driving of the ego vehicle on the driving trajectory.

When a change on the target path is not sensed in step S300, the control unit 600 maintains the backward driving control of the ego vehicle according to the driving trajectory generated in step S100, in step S600.

When a change on the target path is sensed in step S300, the control unit 600 corrects the driving trajectory using driving information of another vehicle which has driven backward on the target path before the ego vehicle, in step S400. As described above, the driving information of the another vehicle includes an actual driving trajectory along which the another vehicle has driven backward on the target path, or longitudinal and lateral displacements of the another vehicle which occur while the another drives backward on the target path. Using the driving information of the another vehicle, the control unit 600 corrects the driving trajectory to follow the actual driving trajectory along which the another vehicle has driven on the target path, such that the ego vehicle drives backward by bypassing the object sensed in step S300, in step S400.

Then, the control unit 600 controls the backward driving of the ego vehicle according to the driving trajectory corrected in step S400, in step S500.

The present embodiment may further include step S700 in which the control unit 600 senses a following vehicle entering the target path when controlling the backward driving of the ego vehicle on the target path, and step S800 in which the control unit 600 transfers a notification to the following vehicle to stop the following vehicle from entering the target path, when the following vehicle entering the target path is sensed. Steps S700 and S800, which are consecutively performed, may be performed while the backward driving of the vehicle is controlled according to the driving trajectory generated in step S100. That is, steps S700 and S800 may be performed between steps S200 and S300. Alternatively, steps S700 and S800 may be performed while the backward driving of the vehicle is controlled according to the driving trajectory corrected in step S400. That is, steps S700 and S800 may be performed after step S500.

Figure 5:
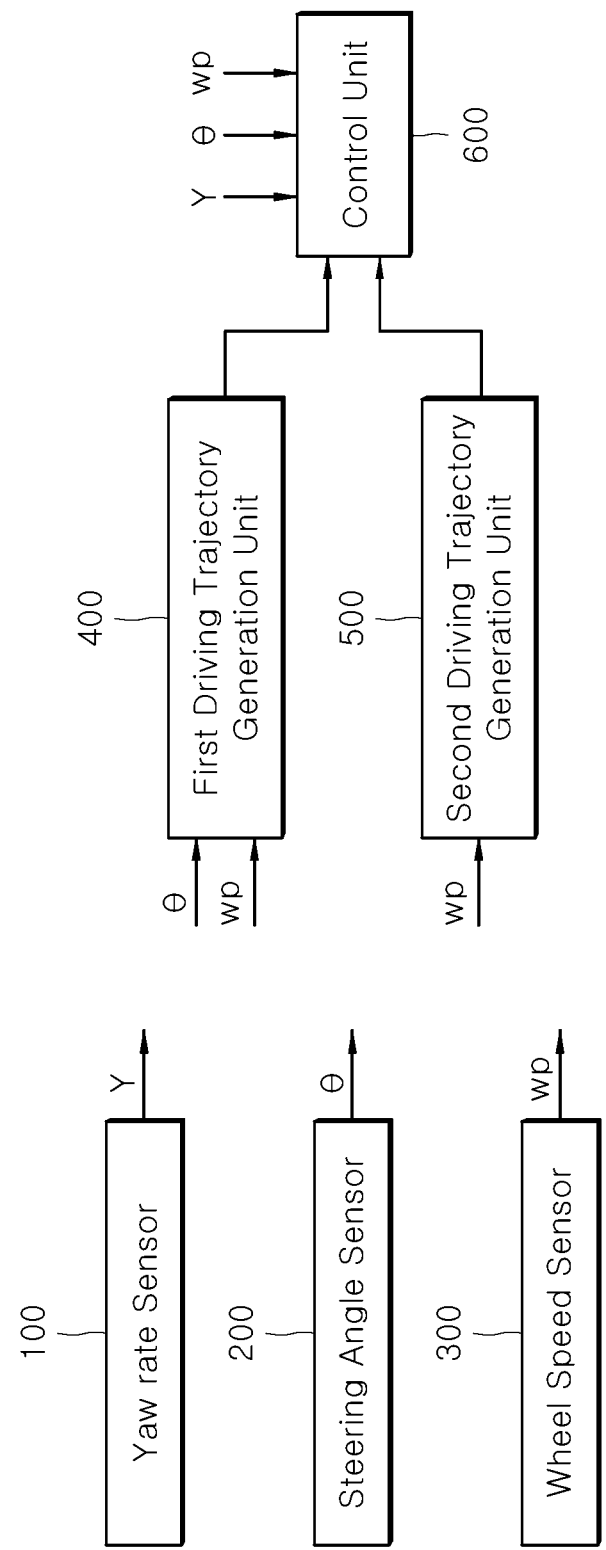
FIG. 5 is a block configuration diagram for describing an apparatus for controlling backward driving of a vehicle in accordance with a second embodiment of the present disclosure.
Figure 6:
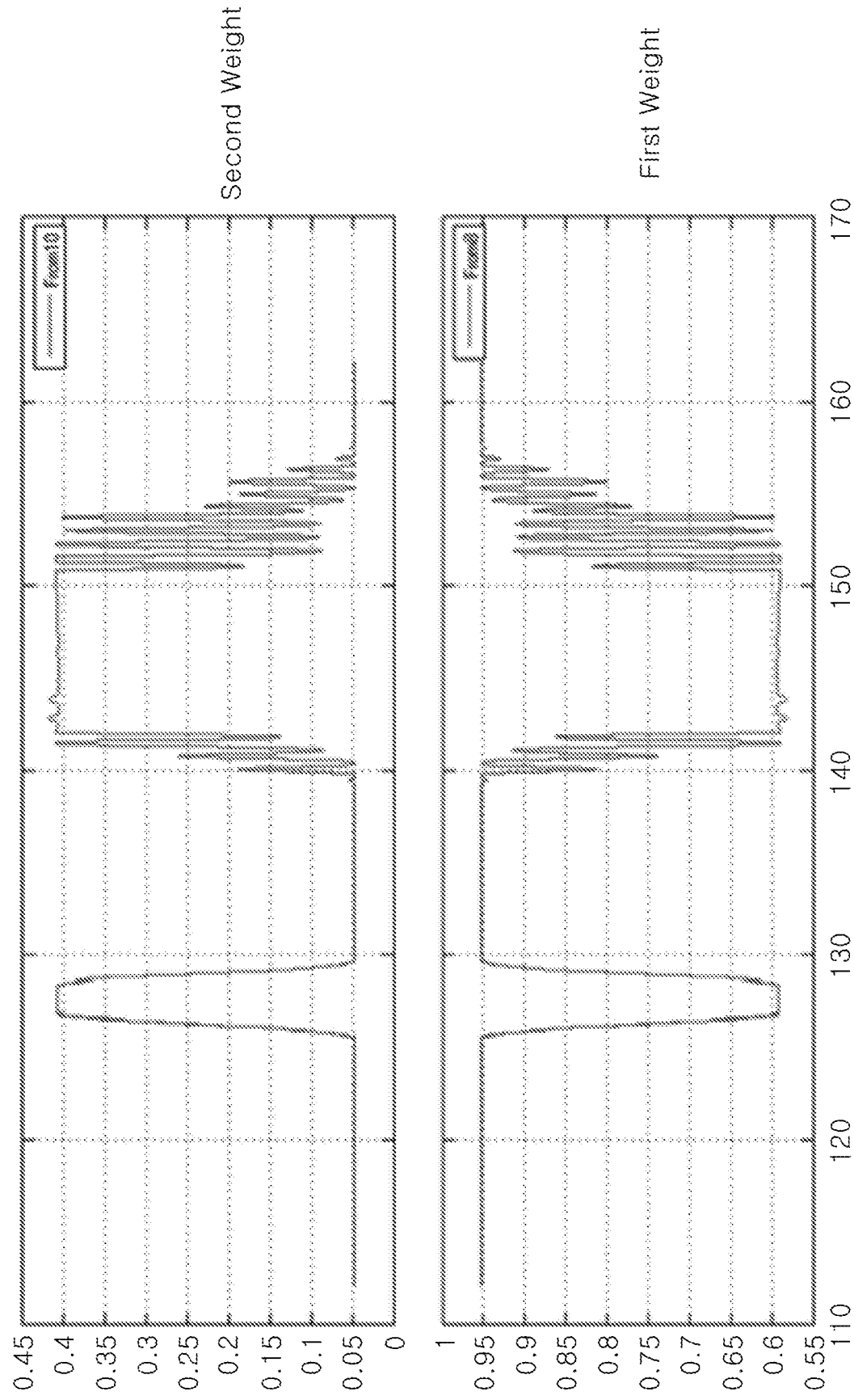
FIG. 6 is a graph illustrating a relative relationship between first and second weights in the apparatus for controlling backward driving of a vehicle in accordance with the second embodiment of the present disclosure.
Figure 11:
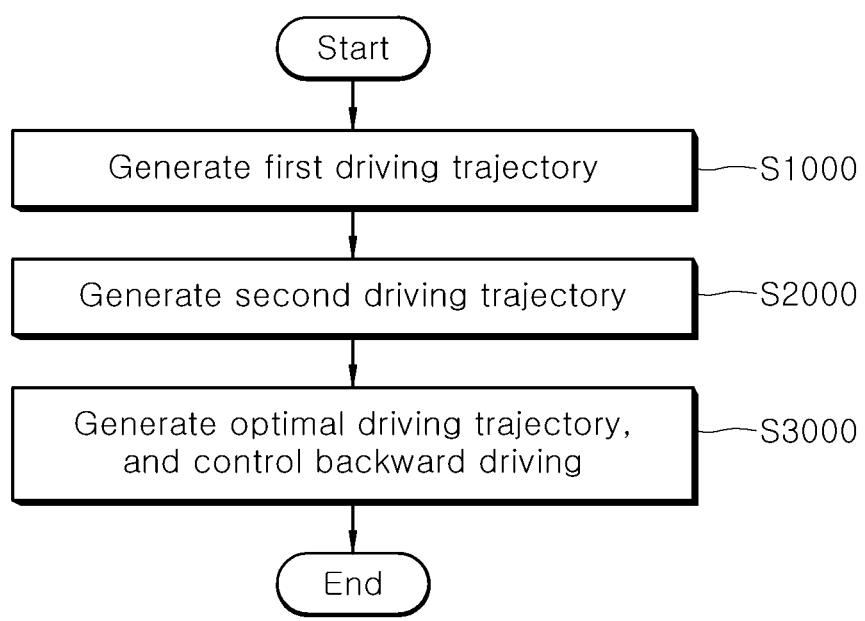
FIG. 11 is a flowchart for describing a method for controlling backward driving of a vehicle in accordance with the second embodiment of the present disclosure.

FIG. 5 is a block configuration diagram for describing an apparatus for controlling backward driving of a vehicle in accordance with a second embodiment of the present disclosure. FIG. 6 is a graph illustrating a relative relationship between first and second weights in the apparatus for controlling backward driving of a vehicle in accordance with the second embodiment of the present disclosure. FIGS. 7 to 10 are diagrams illustrating the values of the first and second weights depending on driving roads in the apparatus for controlling backward driving of a vehicle in accordance with the second embodiment of the present disclosure. FIG. 11 is a flowchart for describing a method for controlling backward driving of a vehicle in accordance with the second embodiment of the present disclosure.

Referring to FIG. 5, the apparatus for controlling backward driving of a vehicle in accordance with the second embodiment of the present disclosure may include a yaw rate sensor 100, a steering angle sensor 200, a wheel speed sensor 300, a first driving trajectory generation unit 400, a second driving trajectory generation unit 500 and a control unit 600. The apparatus for controlling backward driving of a vehicle in accordance with the second embodiment of the present disclosure may be applied to the above-described autonomous backward driving assist system (backward driving assist system).

The yaw rate sensor 100 may detect a yaw rate Y of the vehicle. The yaw rate may indicate the ratio of a value by which the vehicle is rotated to the left based on the Z-axis of the vehicle to a value by which the vehicle is rotated to the right based on the Z-axis of the vehicle. In the present embodiment, the yaw rate may function as an input parameter for training a weight decision model which will be described below, and an input parameter to a weight decision model for deciding first and second weights.

The steering angle sensor 200 may detect a steering angle θ of a steering wheel. In the present embodiment, the steering angle may be used to estimate a lateral displacement of the vehicle during a process of generating a first driving trajectory, and function as an input parameter for training the weight decision model which will be described, and an input parameter to the weight decision model for deciding the first and second weights, like the yaw rate.

The wheel speed sensor 300 may count wheel pulses of a wheel (a rear wheel in the present embodiment), and a rear wheel speed and a vehicle speed of the vehicle may be recognized from the wheel pulse count value WP. Hereafter, the rear wheel speed information which will be described below is defined as including a wheel pulse count of a rear wheel and a left/right rear wheel speed difference. The wheel pulse count of the rear wheel may indicate the average value of wheel pulse counts of left and right rear wheels, for example. As described below, the wheel pulse count may be used to estimate a longitudinal displacement of the vehicle during a process of generating a second driving trajectory. The left/right rear wheel speed difference may be used to estimate a lateral displacement of the vehicle during the process of generating the second driving trajectory, and function as an input parameter for training the weight decision model and an input parameter to the weight decision model for deciding the first and second weights, like the yaw rate and the steering angle.

The first driving trajectory generation unit 400 may generate the first driving trajectory for backward driving of the vehicle, based on the rear wheel speed information and the steering angle information, which are acquired while the vehicle drives forward along the target path. Since the first driving trajectory is decided depending on the direction angle of the vehicle when the vehicle drives backward (i.e. the heading angle of the vehicle), the first driving trajectory may have the same meaning as a first direction angle of the vehicle when the vehicle drives backward.

Specifically, the first driving trajectory generation unit 400 may generate the first driving trajectory by estimating the longitudinal displacement of the vehicle through the wheel pulse count and estimating the lateral displacement of the vehicle through the steering angle information. That is, the first driving trajectory generation unit 400 may estimate the longitudinal displacement of the vehicle by accumulating the wheel pulse counts and estimate the lateral displacement of the vehicle by using a change in the steering angle. Then, the first driving trajectory generation unit 400 may generate the first driving trajectory by mapping the estimated longitudinal displacement and the estimated lateral displacement in accordance with time. When estimating the lateral displacement of the vehicle, the first driving trajectory generation unit 400 may further consider the yaw rate with the steering angle.

The second driving trajectory generation unit 500 may generate the second driving trajectory for backward driving of the vehicle, based on the rear wheel speed information which is acquired while the vehicle drives forward along the target path. Since the second driving trajectory is also decided depending on the direction angle of the vehicle when the vehicle drives backward (i.e. the heading angle of the vehicle), the second driving trajectory may have the same meaning as a second direction angle of the vehicle when the vehicle drives backward.

Specifically, the second driving trajectory generation unit 500 may generate the second driving trajectory by estimating the longitudinal displacement of the vehicle through the wheel pulse count and estimating the lateral displacement of the vehicle through the left/right rear wheel speed difference (i.e. a difference between the speed of a left rear wheel and the speed of a right rear wheel). That is, the second driving trajectory generation unit 500 may estimate the longitudinal displacement of the vehicle by accumulating the wheel pulse counts and estimate the lateral displacement of the vehicle from the left/right rear wheel speed difference. Then, the second driving trajectory generation unit 500 may generate the second driving trajectory by mapping the estimated longitudinal displacement and the estimated lateral longitudinal displacement in accordance with time.

The lateral displacement of the vehicle, which is used to generate the first driving trajectory, is estimated based on the steering angle. Thus, when the road has a small curvature, the first driving trajectory may be generated more accurately because a lateral error is not large. However, when the road has a large curvature, the accuracy of the first driving trajectory may decrease because the lateral error increases. On the other hand, the lateral displacement of the vehicle, which is used to generate the second driving trajectory, is estimated based on the left/right rear wheel speed difference. Thus, when the road has a large curvature, the second driving trajectory may be generated more accurately because a lateral error is not large. However, when the road has a small curvature, the accuracy of the second driving trajectory may decrease because the wheel speeds of the left and right rear wheels are changed at a low rate such that the lateral error increases.

That is, the accuracy of the first driving trajectory increases when the road has a small curvature, and the accuracy of the second driving trajectory increases when the road has a large curvature. In other words, the accuracies of the first and second driving trajectories have a complementary relationship therebetween according to the curvature of the road on which the vehicle drives. Therefore, the present embodiment suggests a method which can decide a weight for compensating for the complementary characteristic between the first and second driving trajectories according to the curvature of a target path on which the vehicle drives backward, and decide an optimal driving trajectory based on the decided weight, thereby improving the accuracy of the driving trajectory for backward driving. Hereafter, the configuration of the present embodiments will be described in detail, focusing on the operations of the weight decision model and the control unit 600.

The control unit 600 may decide the first and second weights for compensating for the complementary characteristic between the first and second driving trajectories by acquiring a curvature parameter indicating the curvature of the target path on which the vehicle has driven forward, through a sensor mounted in the vehicle, and applying the acquired curvature parameter to a previously-trained weight decision model, decide the optimal driving trajectory by applying the decided first and second weights to the first and second driving trajectories, respectively, and control the backward driving of the vehicle on the target path according the optimal driving trajectory. The curvature parameter may also function as an input parameter of the weight decision model during a process of training the weight decision model and a process of deciding the first and second weights through the trained weight decision model, and include one or more of the yaw rate, the steering angle and the left/right rear wheel speed difference, which are acquired through the yaw rate sensor 100, the steering angle sensor 200 and the wheel speed sensor 300.

Since the first and second weights are used to compensate for the complementary characteristic between the first and second driving trajectories, the values of the first and second weights may have a relative relationship therebetween as illustrated in FIG. 6. For example, the values of the first and second weights may be relatively decided in such a range that the sum of the first and second weights is equal to 1.

The training process of the weight decision model, which is a precondition for deciding the first and second weights, will be described with reference to FIGS. 7 to 10. In FIGS. 7 to 10, 'S' represents the length of a straight road, 'C' represents the length of a curved road, 'R' represents a radius of curvature, 'SAS' represents a steering angle, and $\alpha$ and $\beta$ represent the first and second weights, respectively.

The weight decision model may have been previously trained to receive one or more of the yaw rate, the steering angle and the left/right rear wheel speed difference, which are acquired as the curvature parameters during a typical driving process of the vehicle, and to decide the first weight which decreases as the driving road has a large curvature, and the second weight which increases as the driving road has a large curvature. In this case, an additional variable may be used for training the weight decision model, with the yaw rate, the steering angle and the left/right rear wheel speed difference. As a training algorithm of the weight decision model, a machine learning algorithm may be used.

Figure 7:
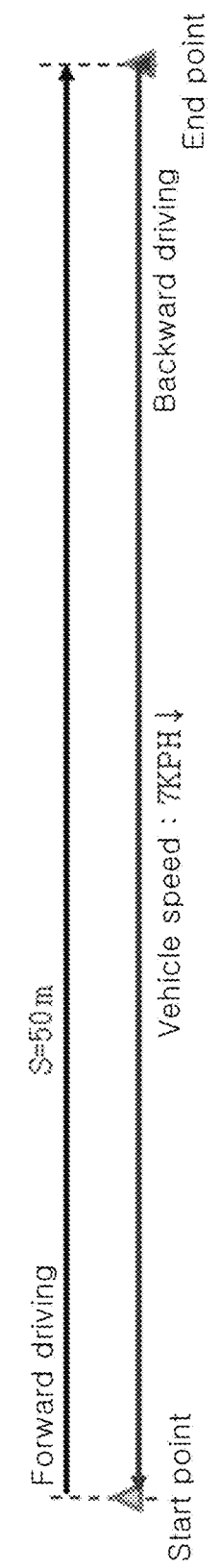
FIGS. 7, 8, 9, and 10 are diagrams illustrating the values of the first and second weights depending on driving roads in the apparatus for controlling backward driving of a vehicle in accordance with the second embodiment of the present disclosure.
Figure 8:
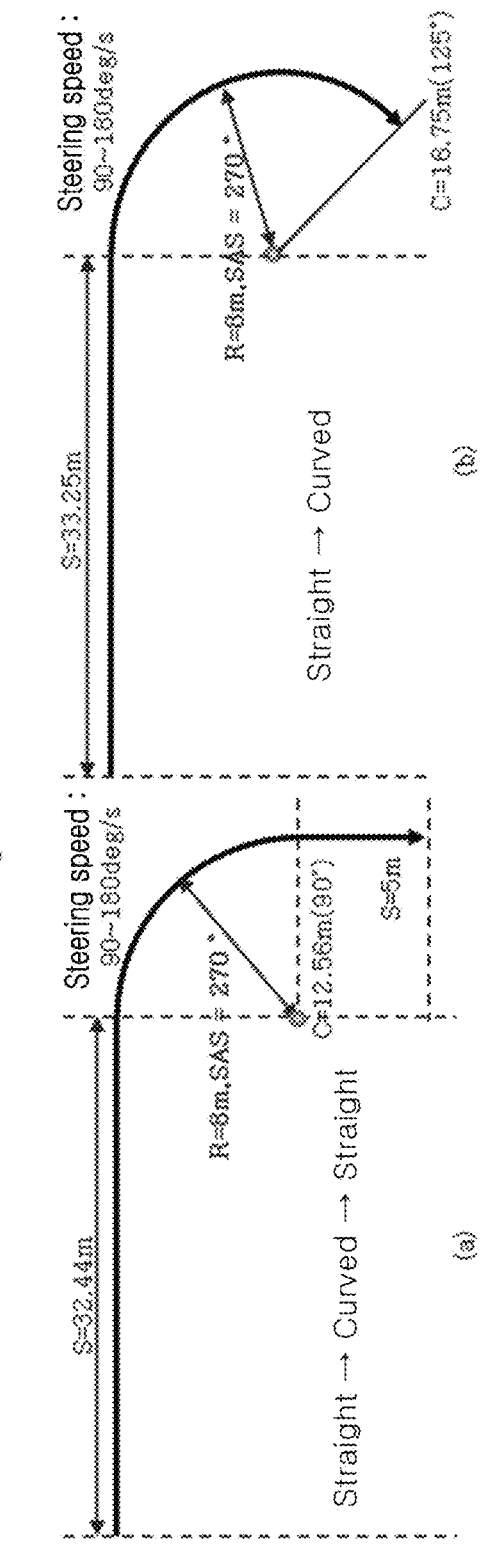
Figure 9:
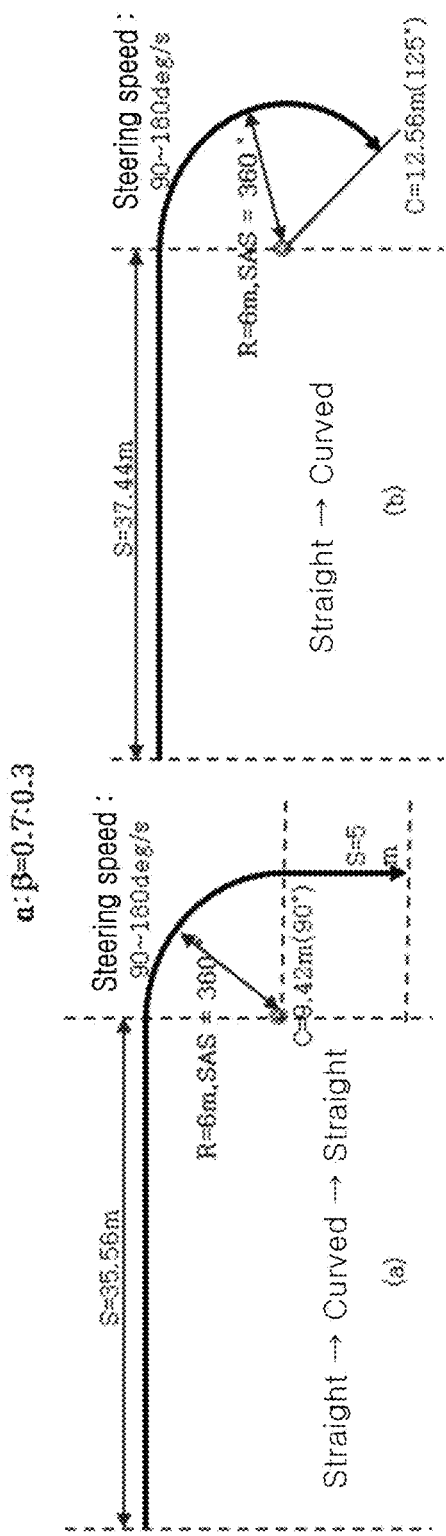
Figure 10:
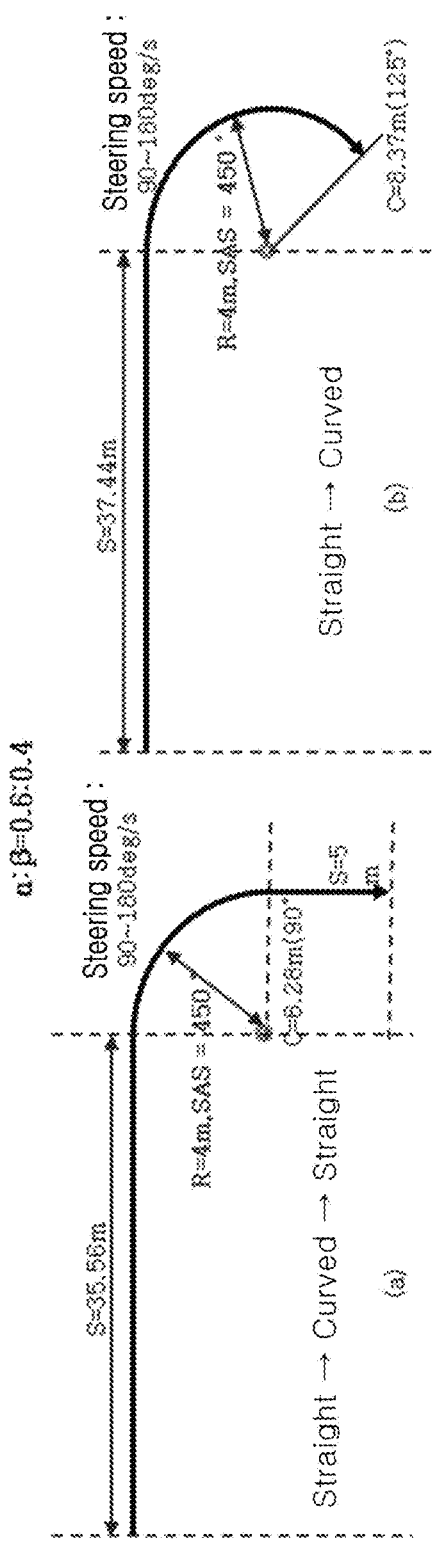

FIG. 7 illustrates an example in which the vehicle drives on a straight road. When the vehicle drives on the straight road, the accuracy of the first driving trajectory is relatively high, and the accuracy of the second driving trajectory is relatively low. Therefore, the target value of the second weight needs to be set to the lower limit value thereof. FIG. 7 illustrates an example in which the weight decision model is trained in such a state that the target value of the first weight is set to the upper limit value of 0.95 and the target value of the second weight is set to the lower limit value of 0.05. The target value of the first weight and the target value of the second weight may be set to various values according to a designer's intention and system requirements.

FIGS. 8A and 8B illustrate an example in which the vehicle drives on roads each including a curved road with a curvature radius R of 8 m. When a curved road is included in the driving road, the accuracy of the second driving trajectory is high. Thus, the target value of the second weight needs to be increased further than in FIG. 7. Therefore, FIGS. 8A and 8B illustrate an example in which the weight decision model is trained in such a state that the target value of the first weight is set to 0.8 and the target value of the second weight is set to 0.2. FIGS. 8A and 8B illustrate two different road patterns which include curved roads having the same curvature. In the present embodiment, the training of the weight decision model and the decision of the first and second weights through the trained weight decision model are performed on a road pattern basis. Thus, in both cases of FIGS. 8A and 8B, the weight decision model may be trained to decide the first and second weights as 0.8 and 0.2, respectively.

FIGS. 9A and 9B illustrate an example in which the vehicle drives on roads each including a curved road having a curvature radius R of 6 m. In the example of FIGS. 9A and 9B, the curvature of the curved road is larger than in FIGS. 8A and 8B. Thus, the target value of the second weight needs to be increased further than in FIGS. 8A and 8B. Therefore, FIGS. 9A and 9B illustrate an example in which the weight decision model is trained in such a state that the target value of the first weight is set to 0.7 and the target value of the second weight is set to 0.3. In both cases of FIGS. 9A and 9B, the weight decision model may be trained to decide the first and second weights as 0.7 and 0.3, respectively.

FIGS. 10A and 10B illustrate an example in which the vehicle drives on roads each including a curved road having a curvature radius R of 4 m. In the example of FIGS. 10A and 10B, the curvature of the curved road is larger than in FIGS. 9A and 9B. Thus, the target value of the second weight needs to be increased further than in FIGS. 9A and 9B. Therefore, FIGS. 10A and 10B illustrate an example in which the weight decision model is trained in such a state that the target value of the first weight is set to 0.6 and the target value of the second weight is set to 0.4. In both cases of FIGS. 10A and 10B, the weight decision model may be trained to decide the first and second weights as 0.6 and 0.4, respectively.

FIGS. 7 to 10 illustrate some examples in which the weight decision model is trained. While the vehicle drives on more various patterns of roads, the process of setting the target values of the first and second weights required for the corresponding road patterns and training the weight decision model may be repeatedly performed. In this way, the training process of the weight decision model may be previously completed. Then, the completely trained weight decision model may function to receive curvature parameters, and return the first and second weights corresponding to the curvature parameters.

After the weight decision model is completely trained, the control unit 600 may decide the first and second weights by applying one or more of the yaw rate, the steering angle and the left/right rear wheel speed difference, which are acquired as curvature parameters indicating the curvature of the target path while the vehicle drives forward on the target path, to the weight decision model, and merge the first and second driving trajectories by applying the decided first and second weights to the first and second driving trajectories, respectively, thereby deciding the optimal driving trajectory for backward driving of the vehicle. As the method for deciding the optimal driving trajectory by merging the first and second driving trajectories, a method for deciding a weighted sum for the first and second driving trajectories through the first and second weights may be applied.

The second weight may be decided in a range equal to or more than a pre-defined lower limit value through the weight decision model. Considering that the first and second weights are interdependently decided, it may be expressed that the first weight is decided in a range equal to or less than a pre-defined upper limit value through the weight decision model. That is, when the vehicle drives on a straight road in FIGS. 7A and 7B, the weight decision model is trained in such a state that the target value of the second weight is set to the lower limit value of 0.05. As a result, the second weight is decided in a range equal to or more than the lower limit value. The lower limit value of the second weight functions as a design margin considering a predetermined curvature which the straight road inevitably has.

When the optimal driving trajectory is decided through the above-described process, the control unit 600 may control the backward driving of the vehicle on the target path according to the decided optimal driving trajectory. That is, as described above, the apparatus for controlling backward driving of a vehicle in accordance with the present embodiment may be applied to the autonomous backward driving assist system (backward driving assist system) applied to a vehicle. Thus, when a driver performs an operation of starting an autonomous backward driving assist function (for example, P-stage of transmission→function switch on→R stage of transmission in stopping state), the backward driving of the vehicle may be controlled according to the driving trajectory through an acceleration/deceleration operation by the driver and a system automatic steering operation by the control unit 600.

Through the above-described configuration of the present embodiment, the control unit 600 may generate the optimal backward driving trajectory by merging the first and second driving trajectories whose accuracies have a complementary characteristic according to the curvature of the road. Thus, the control unit 60 may remove an error on the driving trajectory depending on the road characteristic, such that the autonomous backward driving can be performed more accurately. Furthermore, the yaw rate, the steering angle and the left/right rear wheel speed difference may be adopted as curvature parameters for deciding the first and second weights through the training of the weight decision model and the trained weight decision model, and the curvature parameters may be secured through local sensors such as the yaw rate sensor 100, the steering angle sensor 200 and the wheel speed sensor 300, which are mounted in the vehicle. Therefore, separate sensors are not additionally required, which makes it possible to reduce the cost.

So far, it has been described that the first and second driving trajectory generation units 400 and 500 and the control unit 600 are separated from each other, in order to promote understandings of the present embodiment. In an embodiment, however, the functions of the first and second driving trajectory generation units 400 and 500 may be integrated with those of the control unit 600. The first and second driving trajectory generation units 400 and 500 and the control unit 600 may be implemented as a processor or SoC (System on Chip) which processes and calculates various data, and designed to load instructions or data received from other components to a memory and process the loaded instructions or data, and store various data in the memory.

FIG. 11 is a flowchart for describing a method for controlling backward driving of a vehicle in accordance with the second embodiment of the present disclosure. Referring to FIG. 11, the method for controlling backward driving of a vehicle in accordance with the second embodiment of the present disclosure will be described. Hereafter, the descriptions of contents overlapping the above-described contents will be omitted herein, and the following descriptions will be focused on a time series configuration.

The first driving trajectory generation unit 400 generates a first driving trajectory for backward driving of a vehicle, based on rear wheel speed information and steering angle information, which are acquired while the vehicle drives forward along a target path, in step S100. In step S100, the first driving trajectory generation unit 400 generates the first driving trajectory by estimating a longitudinal displacement of the vehicle through a wheel pulse count and estimating a lateral displacement of the vehicle through the steering angle information.

The second driving trajectory generation unit 500 may generate a second driving trajectory for backward driving of the vehicle, based on the rear wheel speed information which is acquired while the vehicle drives forward along the target path, in step S200. In step S200, the second driving trajectory generation unit 500 generates the second driving trajectory by estimating the longitudinal displacement of the vehicle through the wheel pulse count and estimating the lateral displacement of the vehicle through a left/right rear wheel speed difference.

Steps S1000 and S2000 are independent steps which are performed in parallel, and the order thereof is not limited to the above-described order.

After steps S1000 and S2000, the control unit 600 decides the first and second weights for compensating for the complementary characteristic between the first and second driving trajectories by applying curvature parameters, indicating the curvature of the target path, to a previously-trained weight decision model, decides an optimal driving trajectory by applying the decided first and second weights to the first and second driving trajectories, respectively, and controls the backward driving of the vehicle on the target path according to the optimal driving trajectory, in step S3000.

The weight decision model may have been previously trained to receive one or more of the yaw rate, the steering angle and the left/right rear wheel speed difference, which are acquired as the curvature parameters while the vehicle drives, and to decide the first weight which decreases as the driving road has a large curvature and decide the second weight which increases as the driving road has a large curvature. Thus, in step S3000, the control unit 600 decides the first and second weights by applying one or more of the yaw rate, the steering angle and the left/right rear wheel speed difference, which are acquired as the curvature parameters indicating the curvature of the target path while the vehicle drives forward along the target path, to the weight decision model, and merges the first and second driving trajectories by applying the decided first and second weights to the first and second driving trajectories, respectively, thereby deciding the optimal driving trajectory for backward driving of the vehicle. Then, the control unit 600 controls the backward driving of the vehicle on the target path according to the decided optimal driving trajectory.

In the present embodiment, when a change in the driving environment, such as an obstacle, is sensed on the path where the ego vehicle is driving backward, the apparatus and method may correct the driving trajectory through driving information of another vehicle which has driven backward on the corresponding path before the ego vehicle, such that the ego vehicle can successfully drive backward by bypassing the obstacle. Furthermore, the apparatus and method may transfer a notification to a following vehicle entering the corresponding path in order to notify that the following vehicle cannot move forward, and thus prevent a collision or congestion between the ego vehicle and the following vehicle.

Furthermore, the apparatus and method may generate a backward driving trajectory by merging two driving trajectories whose accuracies are complementary to each other, according to the curvature of the road, in the backward driving assist system. Thus, the apparatus and method may remove an error on the driving trajectory depending on the road characteristic, thereby generating a more accurate driving trajectory.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for controlling backward driving of a vehicle, comprising:
    a first driving trajectory generation unit configured to generate a first driving trajectory for backward driving of a vehicle, based on rear wheel speed information and steering angle information, which are acquired while the vehicle drives forward along a target path;
    a second driving trajectory generation unit configured to generate a second driving trajectory for backward driving of the vehicle, based on the rear wheel speed information which is acquired while the vehicle drives forward along the target path; and
    a control unit configured to:
    decide a first weight and a second weight for compensating for a complementary characteristic between the first and second driving trajectories by applying a curvature parameter, indicating the curvature of the target path, to a previously-trained weight decision model;
    decide an optimal driving trajectory by applying the decided first and second weights to the first and second driving trajectories, respectively; and control the backward driving of the vehicle on the target path according to the decided optimal driving trajectory, wherein:

the rear wheel speed information comprises a wheel pulse count and a left/right rear wheel speed difference;

the first driving trajectory generation unit generates the first driving trajectory by estimating a longitudinal displacement of the vehicle through the wheel pulse count and estimating a lateral displacement of the vehicle through the steering angle information; and the second driving trajectory generation unit generates the second driving trajectory by estimating the longitudinal displacement of the vehicle through the wheel pulse count and estimating the lateral displacement of the vehicle through the left/right rear wheel speed difference.

2. The apparatus of claim 1, wherein:

the curvature parameter comprises one or more of a yaw rate, a steering angle, and the left/right rear wheel speed difference of the vehicle; and the weight decision model is previously trained to receive one or more of the yaw rate, the steering angle and the left/right rear wheel speed difference, which are acquired as the curvature parameter while the vehicle drives, and to decide the first weight which decreases as a driving road has a large curvature, and decide the second weight which increases as the driving road has a large curvature.

3. The apparatus of claim 2, wherein the control unit:

decides the first and second weights by applying one or more of the yaw rate, the steering angle and the left/right steering wheel speed difference, which are acquired as the curvature parameter indicating the curvature of the target path while the vehicle drives forward on the target path, to the weight decision model;

decides the optimal driving trajectory by merging the first and second driving trajectories through a process of applying the decided first and second weights to the first and second driving trajectories, respectively; and then controls the backward driving of the vehicle on the target path according to the decided optimal driving trajectory.

4. The apparatus of claim 2, wherein the second weight is decided in a range equal to or greater than a pre-defined lower limit value through the weight decision model.

5. The apparatus of claim 1, wherein the control unit acquires one or more of the yaw rate, the steering angle, and the left/right rear wheel speed difference of the vehicle as the curvature parameter through a yaw rate sensor, a steering angle sensor, and a wheel speed sensor, which are mounted in the vehicle.

6. The apparatus of claim 1, wherein the apparatus is applied to an autonomous backward driving assist system applied to the vehicle.

7. A method for controlling backward driving of a vehicle, comprising:

generating, by a first driving trajectory generation unit, a first driving trajectory for backward driving of a vehicle, based on rear wheel speed information and steering angle information, which are acquired while the vehicle drives forward along a target path;

generating, by a second driving trajectory generation unit, a second driving trajectory for backward driving of the vehicle, based on the rear wheel speed information which is acquired while the vehicle drives forward along the target path; and deciding, by a control unit, a first weight and a second weight for compensating for a complementary characteristic between the first and second driving trajectories by applying a curvature parameter, indicating the curvature of the target path, to a previously-trained weight decision model, deciding an optimal driving trajectory by applying the decided first and second weights to the first and second driving trajectories, respectively, and controlling the backward driving of the vehicle on the target path according to the optimal driving trajectory, the rear wheel speed information comprises a wheel pulse count and a left/right rear wheel speed difference;

in the generating of the first driving trajectory, the first driving trajectory generation unit generates the first driving trajectory by estimating a longitudinal displacement of the vehicle through the wheel pulse count and estimating a lateral displacement of the vehicle through the steering angle information; and in the generating of the second driving trajectory, the second driving trajectory generation unit generates the second driving trajectory by estimating the longitudinal displacement of the vehicle through the wheel pulse count and estimating the lateral displacement of the vehicle through the left/right rear wheel speed difference.

8. The method of claim 7, wherein:

the curvature parameter comprises one or more of a yaw rate, a steering angle, and the left/right rear wheel speed difference of the vehicle; and the weight decision model is previously trained to receive one or more of the yaw rate, the steering angle, and the left/right rear wheel speed difference, which are acquired as the curvature parameter while the vehicle drives, and to decide the first weight which decreases as a driving road has a large curvature, and decide the second weight which increases as the driving road has a large curvature.

9. The method of claim 8, wherein in the controlling of the backward driving, the control unit:

decides the first and second weights by applying the yaw rate, the steering angle, and the left/right steering wheel speed difference, which are acquired as the curvature parameter indicating the curvature of the target path while the vehicle drives forward on the target path, to the weight decision model;

decides the optimal driving trajectory by merging the first and second driving trajectories through a process of applying the decided first and second weights to the first and second driving trajectories, respectively; and then controls the backward driving of the vehicle on the target path according to the decided optimal driving trajectory.

10. The method of claim 8, wherein the second weight is decided in a range equal to or greater than a pre-defined lower limit value through the weight decision model.

* * * * *